US010681601B2

(12) United States Patent
Miao et al.

(10) Patent No.: US 10,681,601 B2
(45) Date of Patent: Jun. 9, 2020

(54) RADIO RESOURCE CONTROL RRC CONFIGURATION METHOD AND RELATED DEVICE

(71) Applicant: Huawei Technologies Co., Ltd., Shenzhen, Guangdong (CN)

(72) Inventors: Jinhua Miao, Shenzhen (CN); Jian Zhang, Beijing (CN); Wei Quan, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/186,225

(22) Filed: Nov. 9, 2018

(65) Prior Publication Data

US 2019/0082366 A1    Mar. 14, 2019

Related U.S. Application Data

(63) Continuation of application No. PCT/CN2016/081683, filed on May 11, 2016.

(51) Int. Cl.
*H04W 36/08* (2009.01)
*H04W 76/15* (2018.01)
(Continued)

(52) U.S. Cl.
CPC ....... *H04W 36/08* (2013.01); *H04W 36/0027* (2013.01); *H04W 36/38* (2013.01);
(Continued)

(58) Field of Classification Search
CPC . H04W 76/15; H04W 76/27; H04W 36/0033; H04W 76/19; H04W 36/0055;
(Continued)

(56) References Cited

U.S. PATENT DOCUMENTS

2014/0192775 A1    7/2014  Li et al.
2014/0241281 A1*   8/2014  Wu ............... H04W 76/15
                                         370/329
(Continued)

FOREIGN PATENT DOCUMENTS

CN    104584633 A    4/2015
CN    104936161 A    9/2015
(Continued)

OTHER PUBLICATIONS

Ericsson (Rapporteur),"Summary of email discussion [82#17][LTE/SCE] Control plane aspects",3GPP TSG-RAN WG2 #83 Tdoc R2-132691,Barcelona, Spain, Aug. 19-23, 2013,total 28 pages.
(Continued)

*Primary Examiner* — Shaima Q Aminzay
(74) *Attorney, Agent, or Firm* — Womble Bond Dickinson (US) LLP

(57) ABSTRACT

A method for configuring radio resource control (RRC) includes: receiving, by user equipment, an RRC configuration message sent by a first base station, where the RRC configuration message includes first RRC configuration content and a channel configuration parameter; configuring, by the user equipment, a first RRC connection between the user equipment and the first base station in response to the first RRC configuration content, and establishing a second RRC connection between the user equipment and a second base station based on the channel configuration parameter; receiving, by the user equipment, second RRC configuration content sent by the second base station; and configuring, by the user equipment, the second RRC connection between the user equipment and the second base station in response to the second RRC configuration content. According to the present disclosure, a transmission delay between base sta-
(Continued)

tions can be reduced and signaling load of a master base station can be reduced.

12 Claims, 6 Drawing Sheets

(51) Int. Cl.
*H04W 36/00* (2009.01)
*H04W 76/10* (2018.01)
*H04W 36/38* (2009.01)
*H04W 36/30* (2009.01)
*H04W 92/10* (2009.01)

(52) U.S. Cl.
CPC ........... *H04W 76/10* (2018.02); *H04W 76/15* (2018.02); *H04W 36/0069* (2018.08); *H04W 36/305* (2018.08); *H04W 92/10* (2013.01)

(58) Field of Classification Search
CPC H04W 84/045; H04W 36/0072; H04W 92/10
USPC .......................................... 455/525
See application file for complete search history.

(56) References Cited

U.S. PATENT DOCUMENTS

| | | |
|---|---|---|
| 2016/0029376 A1 | 1/2016 | Fukuta et al. |
| 2016/0044565 A1 | 2/2016 | Lee et al. |
| 2016/0057660 A1 | 2/2016 | Hong et al. |
| 2016/0338138 A1 | 11/2016 | Pelletier et al. |
| 2017/0099693 A1 | 4/2017 | Deng et al. |

FOREIGN PATENT DOCUMENTS

| | | |
|---|---|---|
| CN | 104936223 A | 9/2015 |
| CN | 105075146 A | 11/2015 |
| CN | 105103613 A | 11/2015 |
| CN | 105122887 A | 12/2015 |
| WO | 2016042766 A1 | 3/2016 |

OTHER PUBLICATIONS

Kyocera,"RLF issues in dual-connectivity",3GPP TSG-RAN WG2 #83bis R2-133503,Ljubljana, Slovenia, Oct. 7-Oct. 11, 2013,total 4 pages.

3GPP TS 36.321 V13.1.0 (Mar. 2016);3rd Generation Partnership Project;Technical Specification Group Radio Access Network; Evolved Universal Terrestrial Radio Access (E-UTRA);Medium Access Control (MAC) protocol specification (Release 13),total 85 pages.

Jian Zhang et al.,"LTE Small Cell Enhancement by Dual Connectivity",Working Group C"Communication Architectures and Technologies",White Paper,Wireless World Research Forum,2014, No. 15,Total 22 pages.

R2-142301 Pantech,"Reestablishment in dual connectivity",3GPP TSG-RAN WG2 Meeting #86, May 19-23, 2014, total 5 pages.

* cited by examiner

RADIO RESOURCE CONTROL RRC CONFIGURATION METHOD AND RELATED DEVICE

CROSS-REFERENCE TO RELATED APPLICATION

This application is a continuation of International Application No. PCT/CN2016/081683, filed on May 11, 2016, the disclosure of which is incorporated by reference herein in its entirety.

TECHNICAL FIELD

The present disclosure relates to the field of wireless network technologies, and in particular, to a Radio Resource Control (RRC) configuration method and a related device.

BACKGROUND

FIG. 1 is a schematic architecture diagram of a dual connection between user equipment (UE) and an evolved NodeB (eNB) according to the prior-art solution. In such an architecture, in one aspect, a master cell group (MCG) and a slave cell group (SCG) retain their respective bearers, and provide services for the UE. In another aspect, a bearer of the MCG is offloaded at a Packet Data Convergence Protocol (PDCP) layer. Some data is sent to a Radio Link Control (RLC) layer of a master eNodeB (MeNB), and other data is sent to an RLC layer of a secondary eNode (SeNB) through an X2 interface and then is sent after being scheduled by the SeNB.

FIG. 2 is a schematic control diagram of a dual connection according to the prior-art solution. Data between an eNB and UE is sent by a MeNB through a wireless connection. When the UE performs dual-connection communication with a SeNB and the MeNB, the SeNB first needs to configure RRC for the UE based on a load status or the like of an SCG for example, transmission configurations at an RLC layer and a Media Access Control (MAC) layer of the SeNB for the UE, and send RRC configuration content to the MeNB through an X2 interface; and the MeNB sends the RRC configurations of an MCG and the SCG to the UE. However, during the sending process, a part of the RRC configuration content continues to be sent to the SeNB through the X2 interface, and then is sent to the UE by the SeNB. Signaling of the SeNB passes through the X2 interface twice, increasing a transmission delay of the SeNB. In addition, if the UE is connected to a plurality of SeNBs, all RRC configuration content of the plurality of SeNBs needs to be sent by the MeNB, and consequently RRC signaling load of the MeNB is excessively heavy.

SUMMARY

The present disclosure provides a Radio Resource Control (RRC) configuration method and a related device, to reduce a transmission delay between base stations and reduce signaling load of a master base station.

According to a first aspect, a method for configuring RRC is described. The method includes:

receiving, by user equipment, an RRC configuration message sent by a first base station, where the RRC configuration message includes first RRC configuration content and a channel configuration parameter; configuring an RRC connection between the user equipment and the first base station in response to the first RRC configuration content, and establishing an RRC connection to a second base station based on the channel configuration parameter; receiving second RRC configuration content sent by the second base station; and configuring the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

In one embodiment, after configuring the RRC connection between the user equipment and the second base station, the user equipment sends an instruction message to the second base station when a radio link fails in the RRC connection between the user equipment and the first base station; after receiving the instruction message, the second base station forwards the instruction message to the first base station; after receiving the instruction message, the first base station selects a third base station as a target base station to be accessed by the user equipment, and sends access configuration information to the second base station; after receiving the access configuration information, the second base station forwards the access configuration information to the user equipment; and the user equipment receives the access configuration information sent by the second base station, and establishes an RRC connection to the third base station based on the access configuration information. This resolves a problem that when a radio link fails in the RRC connection between the user equipment and the first base station, the RRC connection of the UE ends and communication cannot be performed in time because the first base station cannot directly perform an RRC configuration procedure. Accordingly, the RRC configuration procedure can continue to be performed when the radio link fails, so that an RRC connection state is ensured and communication is implemented in time.

In another embodiment, after configuring the RRC connection between the user equipment and the second base station, the user equipment may further send a signal measurement report to the first base station or the second base station; the second base station may forward the signal measurement report to the first base station; after receiving the signal measurement report, the first base station determines, based on the signal measurement report, whether the user equipment needs to be handed over between cells, and when determining that the user equipment needs to be handed over between cells, selects the second base station as a master base station to be accessed by the user equipment and sends a handover request to the second base station; after receiving the handover request, if the second base station allows the user equipment to access the second base station by using the second base station as the master base station, the second base station sends reconfiguration information to the first base station; and the user equipment receives an update request that includes the reconfiguration information and that is sent by the first base station, and accesses, according to the update request, the second base station by using the second base station as the master base station. This resolves a problem that when the user equipment needs to change an accessed master base station, communication cannot be performed in time because the user equipment needs to end an RRC connection between an original cell and the user equipment. Accordingly, the RRC connection between the original cell and the user equipment does not need to be ended, so that a handover delay is reduced.

In yet another embodiment, when sending the access configuration information to the second base station, the first base station may send a reconfiguration request to the third base station; if the third base station allows access of the user equipment, the third base station sends third RRC configuration content to the first base station, the first base station forwards the third RRC configuration content to the second base station, and the second base station forwards the third RRC configuration content to the user equipment; and after receiving the third RRC configuration content, the user equipment configures the RRC connection between the user equipment and the third base station in response to the third RRC configuration content.

According to a second aspect, a method for configuring an RRC is described. The method includes:

sending, by a first base station, an RRC configuration message to user equipment when detecting that a service volume of the user equipment is greater than a first preset threshold or load of the first base station exceeds a second preset threshold, where the RRC configuration message includes first RRC configuration content and a channel configuration parameter; after receiving the RRC configuration message sent by the first base station, configuring, by the user equipment, an RRC connection between the user equipment and the first base station in response to the first RRC configuration content, and establishing an RRC connection to a second base station based on the channel configuration parameter; sending, by the second base station, second RRC configuration content to the user equipment; and after receiving the second RRC configuration content sent by the second base station, configuring, by the user equipment, the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

In one embodiment, the user equipment sends an instruction message to the second base station when a radio link fails in the RRC connection between the user equipment and the first base station; after receiving the instruction message, the second base station forwards the instruction message to the first base station; after receiving the instruction message, the first base station selects a third base station as a target base station to be accessed by the user equipment, and sends access configuration information to the second base station; after receiving the access configuration information, the second base station forwards the access configuration information to the user equipment; and the user equipment receives the access configuration information sent by the second base station, and establishes an RRC connection to the third base station based on the access configuration information. This resolves a problem that when a radio link fails in the RRC connection between the user equipment and the first base station, the RRC connection of the UE ends and communication cannot be performed in time because the first base station cannot directly perform an RRC configuration procedure. Accordingly, the RRC configuration procedure can continue to be performed when the radio link fails, so that an RRC connection state is ensured and communication is implemented in time.

In another embodiment, the user equipment may send a signal measurement report to the first base station or the second base station; the second base station may forward the signal measurement report to the first base station; after receiving the signal measurement report, the first base station determines, based on the signal measurement report, whether the user equipment needs to be handed over between cells, and when determining that the user equipment needs to be handed over between cells, selects the second base station as a master base station to be accessed by the user equipment and sends a handover request to the second base station; after receiving the handover request, if the second base station allows the user equipment to access the second base station by using the second base station as the master base station, the second base station sends reconfiguration information to the first base station; and the user equipment receives an update request that includes the reconfiguration information and that is sent by the first base station, and accesses, according to the update request, the second base station by using the second base station as the master base station. This resolves a problem that when the user equipment needs to change an accessed master base station, communication cannot be performed in time because the user equipment needs to end an RRC connection between an original cell and the user equipment. Accordingly, the RRC connection between the original cell and the user equipment does not need to be ended, so that a handover delay is reduced.

In yet another embodiment, when sending the access configuration information to the second base station, the first base station may send a reconfiguration request to the third base station; if the third base station allows access of the user equipment, the third base station sends third RRC configuration content to the first base station, the first base station forwards the third RRC configuration content to the second base station, and the second base station forwards the third RRC configuration content to the user equipment; and after receiving the third RRC configuration content, the user equipment configures the RRC connection between the user equipment and the third base station in response to the third RRC configuration content.

According to a third aspect, a user equipment is described, the user equipment including:

a receiving module configured to receive an RRC configuration message sent by a first base station, where the RRC configuration message includes first RRC configuration content and a channel configuration parameter; and a processing module configured to: configure an RRC connection between the user equipment and the first base station in response to the first RRC configuration content, and establish an RRC connection to a second base station based on the channel configuration parameter, where the receiving module is configured to receive second RRC configuration content sent by the second base station; and the processing module is configured to configure the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

In one embodiment, the user equipment further includes a sending module, where the sending module sends an instruction message to the second base station when a radio link fails in the RRC connection between the user equipment and the first base station; after receiving the instruction message, the second base station forwards the instruction message to the first base station; after receiving the instruction message, the first base station selects a third base station as a target base station to be accessed by the user equipment, and sends access configuration information to the second base station; after receiving the access configuration information, the second base station forwards the access configuration information to the user equipment; and the receiving module receives the access configuration information sent by the second base station, and the processing module establishes an RRC connection to the third base station based on the access configuration information. This resolves a problem that when a radio link fails in the RRC connection between the user equipment and the first base station, the RRC connection of the UE ends and communication cannot be performed in time because the first base station cannot directly perform an RRC configuration procedure. Accordingly, the RRC configuration procedure can continue to be performed when the radio link fails, so that an RRC connection state is ensured and communication is implemented in time.

In another embodiment, the sending module is further configured to send a signal measurement report to the first base station or the second base station; the second base station may forward the signal measurement report to the first base station; after receiving the signal measurement report, the first base station determines, based on the signal measurement report, whether the user equipment needs to be handed over between cells, and when determining that the user equipment needs to be handed over between cells, selects the second base station as a master base station to be accessed by the user equipment and sends a handover request to the second base station; after receiving the handover request, if the second base station allows the user equipment to access the second base station by using the second base station as the master base station, the second base station sends reconfiguration information to the first base station; and the receiving module receives an update request that includes the reconfiguration information and that is sent by the first base station, and the processing module accesses, according to the update request, the second base station by using the second base station as the master base station. This resolves a problem that when the user equipment needs to change an accessed master base station, communication cannot be performed in time because the user equipment needs to end an RRC connection between an original cell and the user equipment. Accordingly, the RRC connection between the original cell and the user equipment does not need to be ended, so that a handover delay is reduced.

In yet another embodiment, when sending the access configuration information to the second base station, the sending module is further configured to send a reconfiguration request to the third base station; if the third base station allows access of the user equipment, the third base station sends third RRC configuration content to the first base station, the first base station forwards the third RRC configuration content to the second base station, and the second base station forwards the third RRC configuration content to the user equipment; and after receiving the third RRC configuration content, the user equipment configures the RRC connection between the user equipment and the third base station in response to the third RRC configuration content.

According to a fourth aspect, a base station is described, the base station including:

a sending module configured to send an RRC configuration message to user equipment when detecting that a service volume of the user equipment is greater than a first preset threshold or load of the first base station exceeds a second preset threshold, where the RRC configuration message includes first RRC configuration content and a channel configuration parameter; after receiving the RRC configuration message sent by the first base station, the user equipment configures an RRC connection between the user equipment and the first base station in response to the first RRC configuration content, and establishes an RRC connection to a second base station based on the channel configuration parameter; the second base station sends second RRC configuration content to the user equipment; and after receiving the second RRC configuration content sent by the second base station, the user equipment configures the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

In one embodiment, the base station further includes: a receiving module, where the receiving module is configured to receive an instruction message sent by the second base station, where the instruction message is used by the user equipment to send the instruction message to the second base station when a radio link fails in the RRC connection between the user equipment and the first base station, and the second base station forwards the instruction message to the first base station after receiving the instruction message; and a processing module configured to: select, according to the instruction message, a third base station as a target base station to be accessed by the user equipment, and send access configuration information to the second base station, so that the second base station forwards the access configuration information to the user equipment after receiving the access configuration information; and the user equipment receives the access configuration information sent by the second base station, and establishes an RRC connection to the third base station based on the access configuration information. This resolves a problem that when a radio link fails in the RRC connection between the user equipment and the first base station, the RRC connection of the UE ends and communication cannot be performed in time because the first base station cannot directly perform an RRC configuration procedure. Accordingly, the RRC configuration procedure can continue to be performed when the radio link fails, so that an RRC connection state is ensured and communication is implemented in time.

In another embodiment, the receiving module is further configured to receive a signal measurement report sent by the user equipment; the processing module is further configured to: select, based on the signal measurement report when determining that the user equipment needs to be handed over between cells, the second base station as a master base station to be accessed by the user equipment, and send a handover request to the second base station, so that after the second base station receives the handover request, the second base station sends reconfiguration information to the first base station if the second base station allows the user equipment to access the second base station by using the second base station as the master base station; and the user equipment receives an update request that includes the reconfiguration information and that is sent by the first base station, and accesses, according to the update request, the second base station by using the second base station as the master base station. This resolves a problem that when the user equipment needs to change an accessed master base station, communication cannot be performed in time because the user equipment needs to end an RRC connection between an original cell and the user equipment. Accordingly, the RRC connection between the original cell and the user equipment does not need to be ended, so that a handover delay is reduced.

In yet another embodiment, the sending module is further configured to send a reconfiguration request to the third base station; if the third base station allows access of the user equipment, the third base station sends third RRC configuration content to the first base station; the receiving module is further configured to receive the third RRC configuration content sent by the third base station; the processing module is further configured to forwards the third RRC configuration content to the second base station; the second base station forwards the third RRC configuration content to the user equipment; and after receiving the third RRC configuration content, the user equipment configures the RRC connection between the user equipment and the third base station in response to the third RRC configuration content.

According to a fifth aspect, an apparatus for configuring RRC is described, where the apparatus includes a network interface, a memory, and a processor, the memory stores a set of program code, and the processor is configured to invoke the program code stored in the memory, to perform the following operations:

receiving an RRC configuration message sent by a first base station, where the RRC configuration message includes first RRC configuration content and a channel configuration parameter; configuring an RRC connection between the user equipment and the first base station in response to the first RRC configuration content, and establishing an RRC connection to a second base station based on the channel configuration parameter; receiving, based on the RRC connection established to the second base station, second RRC configuration content sent by the second base station; and configuring the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

According to a sixth aspect, a communications system is described, the system including a first base station, a second base station, and user equipment. The user equipment receives an RRC configuration message sent by the first base station, where the RRC configuration message includes first RRC configuration content and a channel configuration parameter; configures an RRC connection between the user equipment and the first base station in response to the first RRC configuration content, and establishes an RRC connection to the second base station based on the channel configuration parameter; receives second RRC configuration content sent by the second base station; and configures the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

In one embodiment, the communications system further includes a third base station. After configuring the RRC connection between the user equipment and the second base station, the user equipment sends an instruction message to the second base station when a radio link fails in the RRC connection between the user equipment and the first base station; after receiving the instruction message, the second base station forwards the instruction message to the first base station; after receiving the instruction message, the first base station selects the third base station as a target base station to be accessed by the user equipment, and sends a reconfiguration request to the third base station when sending access configuration information to the second base station; if the third base station allows access of the user equipment, the third base station sends third RRC configuration content to the first base station, the first base station forwards the third RRC configuration content to the second base station, and the second base station forwards the third RRC configuration content to the user equipment; and the user equipment receives the third RRC configuration content, and configures an RRC connection between the user equipment and the third base station in response to the third RRC configuration content.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Various technologies described in this specification may be applied to various communications systems, including 2G and 3G communications systems and next generation communications systems, for example, 2G communications systems such as Global System for Mobile Communications (GSM); 3G communications systems such as Wideband Code Division Multiple Access (WCDMA) and Time Division-Synchronous Code Division Multiple Access (TD-SCDMA); and next generation communications system such as the Long Term Evolution (LTE) communications system and subsequent evolved systems. A base station may be a base transceiver station (BTS) in the GSM system or the CDMA system, a NodeB in the WCDMA system, an evolved NodeB in the LTE system, or a similar device in a subsequent evolved LTE communications system.

Figure 1:
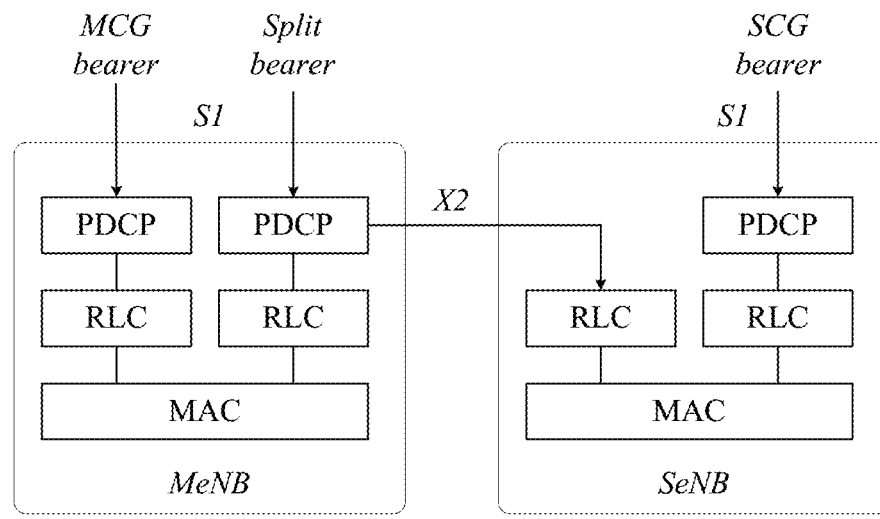
FIG. 1 is a schematic architecture diagram of a dual connection between user equipment and an eNodeB according to the prior-art solution.
Figure 2:
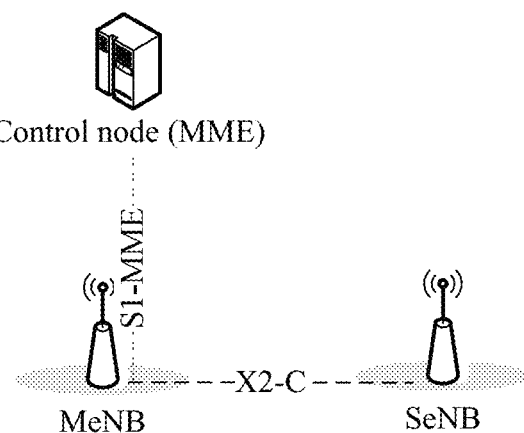
FIG. 2 is a schematic control diagram of a dual connection according to the prior-art solution.
Figure 3:
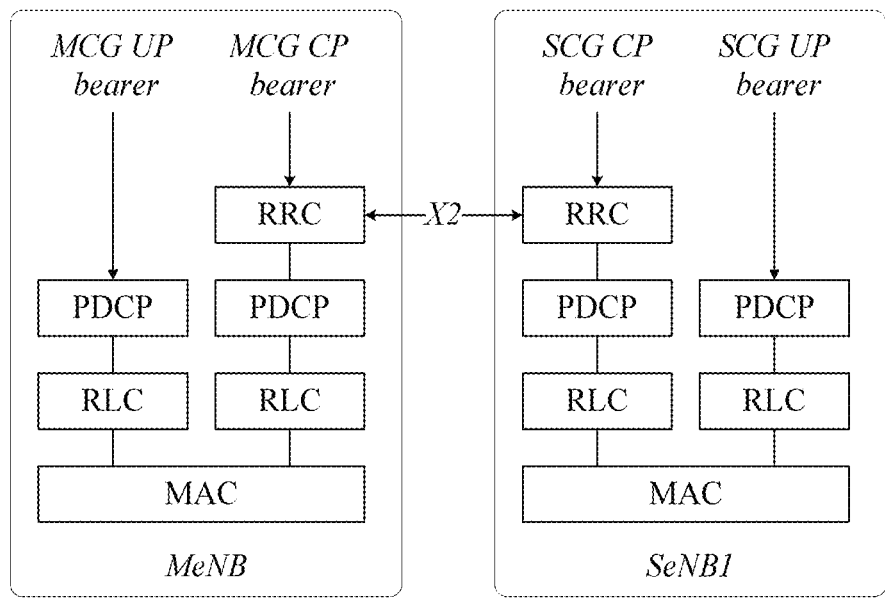
FIG. 3 is a schematic control diagram of a dual connection according to an embodiment.

The present disclosure provides an RRC configuration method and a related device. As shown in FIG. 3, FIG. 3 is a schematic control diagram of a dual connection according to an embodiment, and is mainly applied to an RRC layer. User equipment separately establishes an RRC connection to a first base station (e.g., a MeNB) and a second base station (e.g., a SeNB), and the first base station and the second base station establish a communication connection by using an X2 interface at the RRC layer. It should be noted that the user equipment may further establish RRC connections to a plurality of SeNBs. The following separately provides detailed descriptions.

Figure 4:
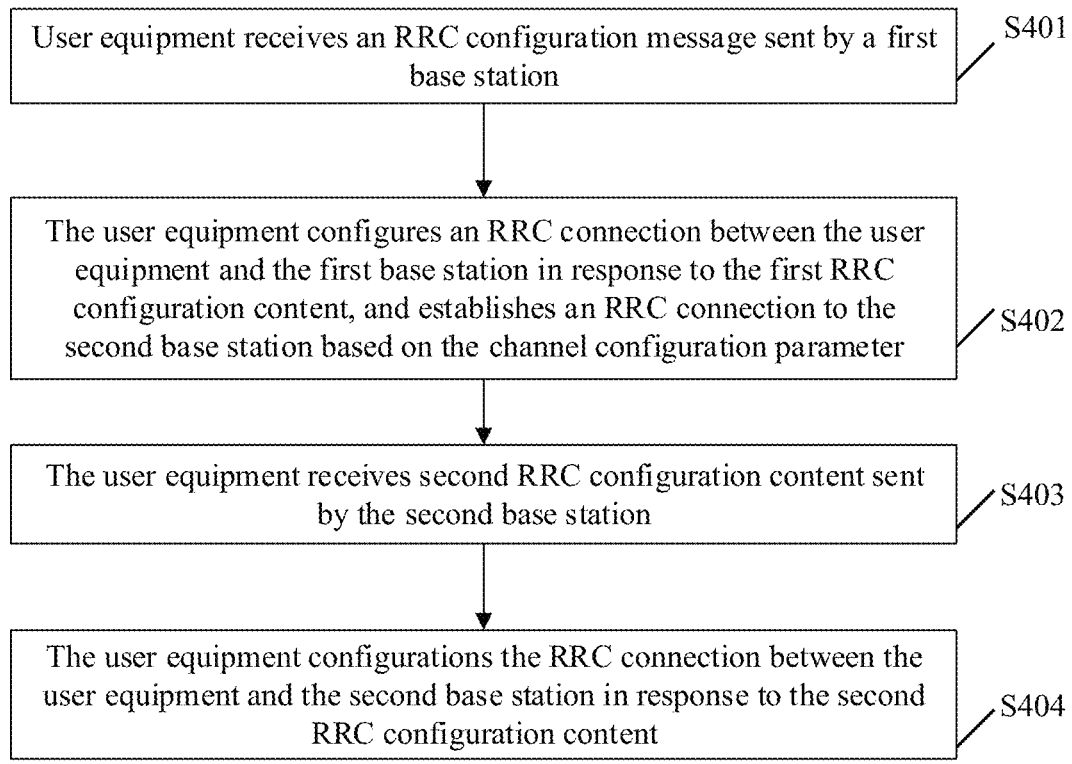
FIG. 4 is a flowchart of an RRC configuration method according to one embodiment.

FIG. 4 is a flowchart of an RRC configuration method according to one embodiment. As shown in the figure, the method in this embodiment includes the following steps.

S401. User equipment receives an RRC configuration message sent by a first base station, where the RRC configuration message includes first RRC configuration content and a channel configuration parameter.

In one embodiment, when the user equipment establishes a communication connection to the first base station, the first base station may check whether a service volume of the user equipment is greater than a first preset threshold and whether load of the first base station exceeds a second preset threshold; and when detecting that the service volume of the user equipment is greater than the first preset threshold or the load of the first base station exceeds the second preset threshold, the first base station may determine that the user equipment needs to configure a multiple-connection communication mode and that the user equipment needs to establish RRC connections to N base stations, where N is an integer greater than or equal to 2. In this case, the first base station may send the RRC configuration message to the user equipment, where the RRC configuration message includes the first RRC configuration content and the channel configuration parameter. The first RRC configuration content includes a plurality of communications protocol layer configurations between the first base station and the user equipment, such as a PDCP configuration, an RLC configuration, a MAC layer configuration, and a physical layer configuration that are in the LTE system. The channel configuration parameter may include a random access channel parameter, a channel bandwidth parameter, a physical layer feedback channel, a physical layer control channel location, and the like. The user equipment may access a second base station by using the channel configuration parameter. The first base station may be a master base station, and the second base station may be a secondary base station.

S402. The user equipment configures an RRC connection between the user equipment and the first base station in response to the first RRC configuration content, and establishes an RRC connection to a second base station based on the channel configuration parameter.

S403. The user equipment receives second RRC configuration content sent by the second base station.

In one embodiment, after the user equipment establishes the RRC connection to the second base station, the second base station may directly send the second RRC configuration content to the user equipment. Therefore, it is not required that the second base station should send the second RRC configuration content to the first base station and then the first base station forwards the second RRC configuration content to the user equipment. During such a forwarding process, the second RRC configuration content is resent to the second base station due to offloading, resulting in a transmission delay. According to the method, a transmission delay can be reduced and signaling load of the first base station can be reduced. The second RRC configuration content may include a plurality of communications protocol layer configurations between the second base station and the user equipment, such as a PDCP configuration, an RLC configuration, a MAC configuration, and a physical layer configuration.

S404. The user equipment configures the RRC connection between the user equipment and the second base station in response to the second RRC configuration content.

In this embodiment, the user equipment receives the RRC configuration message sent by the first base station, where the RRC configuration message includes the first RRC configuration content and the channel configuration parameter; configures the RRC connection between the user equipment and the first base station in response to the first RRC configuration content, and establishes the RRC connection to the second base station based on the channel configuration parameter; receives, based on the RRC connection established to the second base station, the second RRC configuration content sent by the second base station; and configures the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing the transmission delay between base stations and reducing the signaling load of the first base station.

Figure 5:
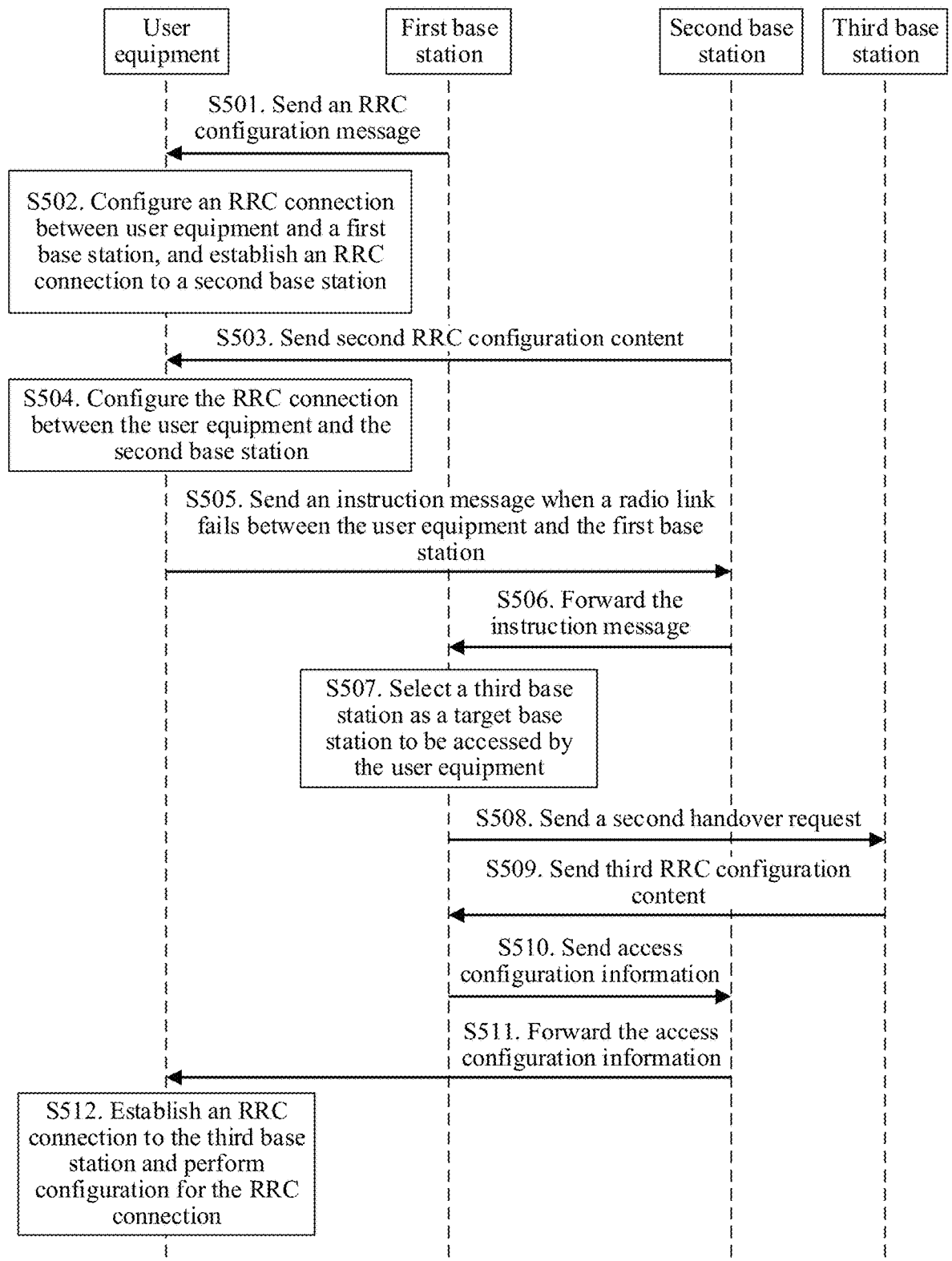
FIG. 5 is a flowchart of a Radio Resource Control RRC configuration method according to one embodiment.

FIG. 5 is a flowchart of an RRC configuration method according to one embodiment. As shown in the figure, the method in this embodiment includes the following steps.

S501. A first base station sends an RRC configuration message to user equipment, where the RRC configuration message includes first RRC configuration content and a channel configuration parameter.

In one embodiment, when the user equipment establishes a communication connection to the first base station, the first base station may check whether a service volume of the user equipment is greater than a first preset threshold and whether load of the first base station exceeds a second preset threshold; and when detecting that the service volume of the user equipment is greater than the first preset threshold or the load of the first base station exceeds the second preset threshold, the first base station may determine that the user equipment needs to configure a multiple-connection communication mode and that the user equipment needs to establish RRC connections to N base stations, where N is an integer greater than or equal to 2. In this case, the first base station may send the RRC configuration message to the user equipment, where the RRC configuration message includes the first RRC configuration content and the channel configuration parameter. The first RRC configuration content includes a plurality of communications protocol layer configurations between the first base station and the user equipment, such as a PDCP configuration, an RLC configuration, a MAC layer configuration, and a physical layer configuration that are in the LTE system. The channel configuration parameter may include a random access channel parameter, a channel bandwidth parameter, a physical layer feedback channel, a physical layer control channel location, and the like. The user equipment may access a second base station by using the channel configuration parameter. The first base station may be a master base station, and the second base station may be a secondary base station.

S502. The user equipment configures an RRC connection between the user equipment and the first base station in response to the first RRC configuration content, and establishes an RRC connection to a second base station based on the channel configuration parameter.

S503. The second base station sends second RRC configuration content to the user equipment.

In one embodiment, after the user equipment establishes the RRC connection to the second base station, the second base station may directly send the second RRC configuration content to the user equipment. Therefore, it is not required that the second base station should send the second RRC configuration content to the first base station and then the first base station forwards the second RRC configuration content to the user equipment. During such a forwarding process, the second RRC configuration content is resent to the second base station due to offloading, resulting in a transmission delay. According to the method, a transmission delay can be reduced and signaling load of the first base station can be reduced. The second RRC configuration content may include a plurality of communications protocol layer configurations between the second base station and the user equipment, such as a PDCP configuration, an RLC configuration, a MAC configuration, and a physical layer configuration.

S504. The user equipment configures the RRC connection between the user equipment and the second base station in response to the second RRC configuration content.

S505. When a radio link fails in the RRC connection between the user equipment and the first base station, the user equipment sends an instruction message to the second base station, where the instruction message includes RRC signaling, a MAC control element, physical layer indication information, or the like.

In one embodiment, the user equipment detects channel quality of a physical layer PDCCH channel according to a preset period, and delivers the channel quality to an RRC layer after smoothing calculation is performed. If average channel quality obtained through calculation is lower than a preset threshold, a radio link fails in an RRC connection between the user equipment and a base station. If a radio link fails in the RRC connection between the first base station (e.g., a MeNB) and the user equipment, the user equipment needs to perform an RRC connection reestablishment procedure, and selects a cell with high channel quality for random access. If a radio link fails in the RRC connection between the second base station (e.g., a SeNB) and the user equipment, the user equipment may send link failure information to the first base station, and then the first base station performs corresponding processing, for example, reselects a base station as a secondary base station corresponding to the user equipment, or instructs the second base station to modify a link configuration. The following describes a specific execution procedure by using an example in which a radio link fails in the RRC connection between the user equipment and the first base station.

In one embodiment, when sending the instruction message to the second base station, the user equipment may further send a signal measurement report to the second base station, and the second base station forwards the signal measurement report to the first base station, where the signal measurement report includes signal quality corresponding to base stations connected to the user equipment.

S506. The second base station forwards the instruction message to the first base station.

S507. The first base station selects, based on the instruction message, a third base station as a target base station to be accessed by the user equipment.

In one embodiment, after receiving the instruction message, the first base station may compare, based on the signal measurement report reported by the user equipment, the signal quality corresponding to the base stations connected to the user equipment, and select the third base station with higher quality as the target base station to be accessed by the user equipment.

S508. The first base station sends a reconfiguration request to the third base station.

S509. The third base station sends third RRC configuration content to the first base station.

In one embodiment, after the third base station receives the reconfiguration request, if the third base station disallows access of the user equipment, the third base station instructs the first base station to select another base station as a target base station to be accessed by the user equipment; if the third base station allows access of the user equipment, the third base station sends the third RRC configuration content to the first base station. The third RRC configuration content includes a plurality of communications protocol layer configurations between the third base station and the user equipment, such as a PDCP configuration, an RLC configuration, a MAC layer configuration, and a physical layer configuration.

S510. The first base station sends access configuration information to the second base station, where the access configuration information includes a cell identity, system bandwidth, a broadcast message, a basic random access message, and the like that are corresponding to the third base station; and the first base station may also forward the third RRC configuration content to the second base station, and the second base station forwards the third RRC configuration content to the user equipment.

S511. The second base station forwards the access configuration information to the user equipment.

S512. The user equipment establishes an RRC connection to the third base station based on the access configuration information.

In one embodiment, after receiving the access configuration information, the user equipment may stop using the first base station as a main control bearer base station of the user equipment, and delete configuration information of the RRC connection between the first base station and the user equipment; use the third base station as the main control bearer base station of the user equipment; and configure the RRC connection between the user equipment and the third base station in response to the third RRC configuration content.

It should be noted that after the second base station forwards the instruction message to the first base station, the first base station may select the second base station, instead of the first base station, as the target base station to be accessed by the user equipment, and send the reconfiguration request to the second base station; after receiving the reconfiguration request, the second base station forwards the access configuration information to the user equipment; and the user equipment reconfigures the RRC connection between the user equipment and the second base station based on the access configuration information.

In this embodiment, when a radio link fails in the RRC connection between the user equipment and the first base station, the user equipment sends the instruction message to the second base station, so that the second base station forwards the instruction message to the first base station, where the instruction message is used to instruct the first base station to select the third base station as the target base station to be accessed by the user equipment; the second base station forwards the access configuration information to the user equipment; and after receiving the access configuration information sent by the second base station, the user equipment established the RRC connection to the third base station based on the access configuration information. This resolves a problem that when a radio link fails in the RRC connection between the user equipment and the first base station, the RRC connection of the UE ends and communication cannot be performed in time because the first base station cannot directly perform an RRC configuration procedure. Accordingly, the RRC configuration procedure can continue to be performed when the radio link fails, so that an RRC connection state is ensured and communication is implemented in time.

Figure 6:
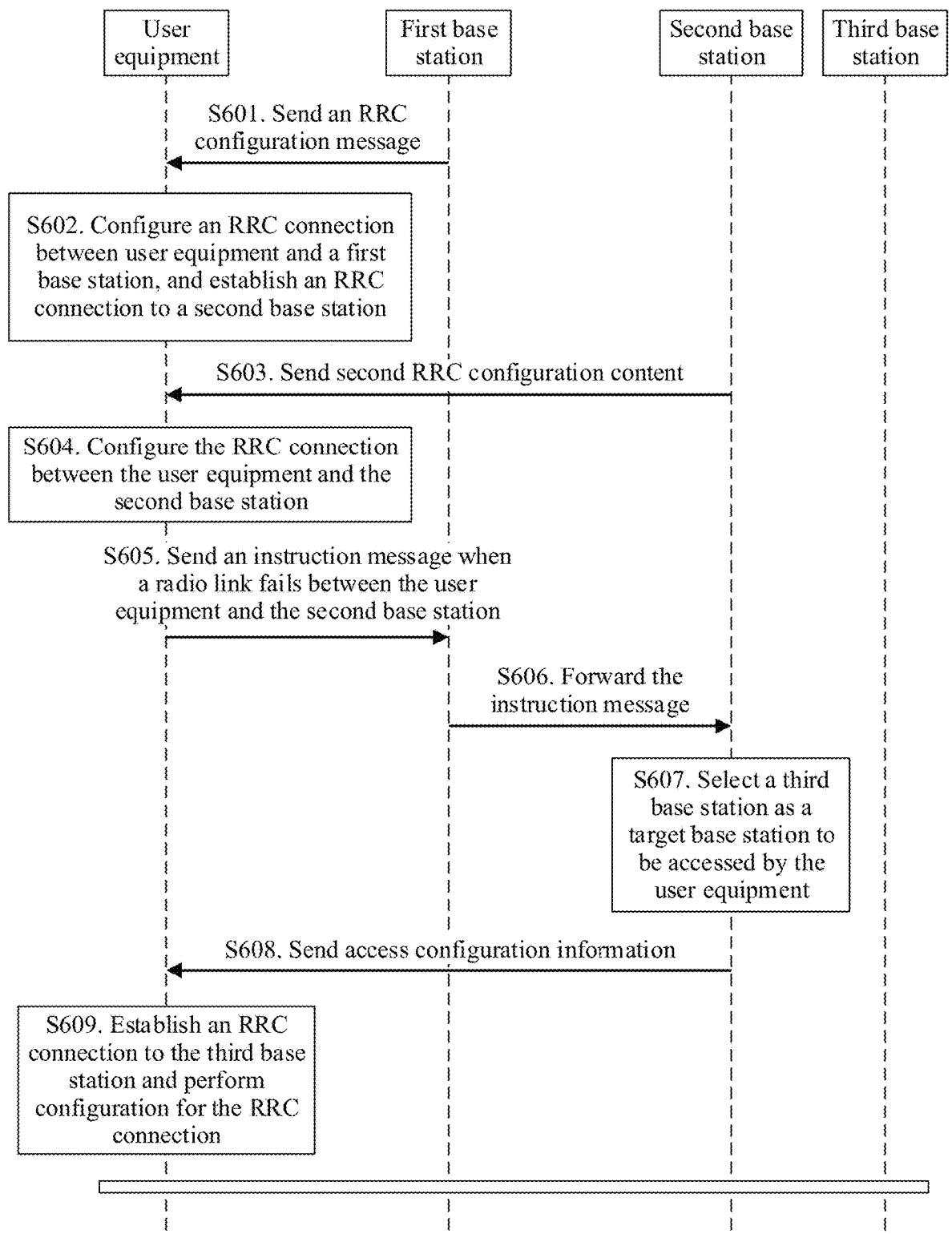
FIG. 6 is a flowchart of an RRC configuration method according to one embodiment.

FIG. 6 is a flowchart of an RRC configuration method according to one embodiment. In this embodiment, when a radio link fails in an RRC connection between user equipment and a second base station, the second base station selects a third base station with higher signal quality as a target base station to be accessed by the user equipment. The steps in this embodiment are performed as follows:

S601. A first base station sends an RRC configuration message to the user equipment, where the RRC configuration message includes first RRC configuration content and a channel configuration parameter.

S602. The user equipment configures an RRC connection between the user equipment and the first base station in response to the first RRC configuration content, and establishes an RRC connection to the second base station based on the channel configuration parameter.

S603. The second base station sends second RRC configuration content to the user equipment.

S604. The user equipment configures the RRC connection between the user equipment and the second base station in response to the second RRC configuration content.

S605. When a radio link fails in the RRC connection between the user equipment and the second base station, the user equipment sends an instruction message to the first base station.

S606. The first base station forwards the instruction message to the second base station.

S607. The second base station selects, based on the instruction message, the third base station as the target base station to be accessed by the user equipment.

S608. The second base station sends access configuration information to the user equipment.

S609. The user equipment establishes an RRC connection to the third base station based on the access configuration information.

Figure 7:
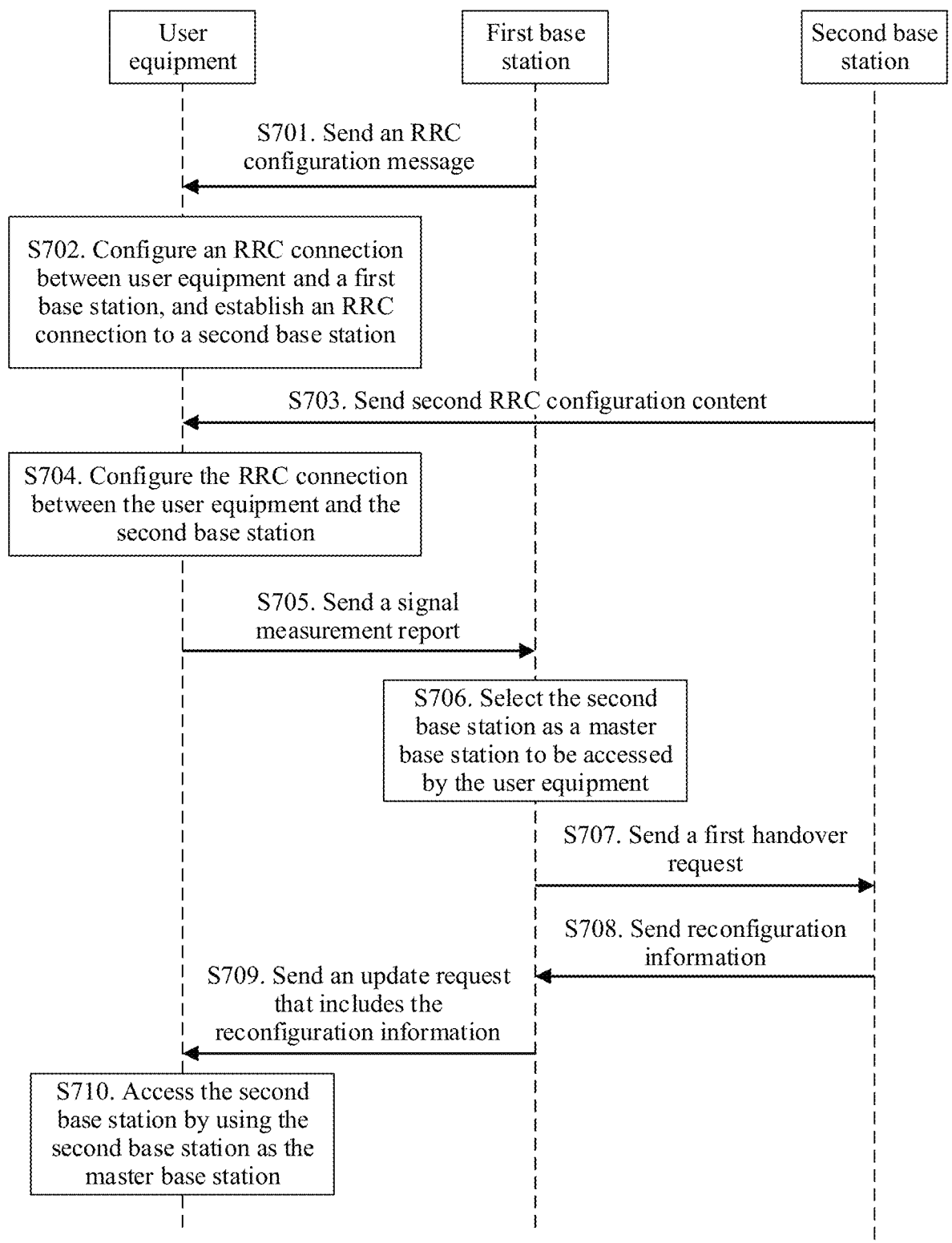
FIG. 7 is a flowchart of an RRC configuration method according to one embodiment.

FIG. 7 is a flowchart of an RRC configuration method according to one embodiment. As shown in the figure, the method in this embodiment includes the following steps.

S701. A first base station sends an RRC configuration message to user equipment, where the RRC configuration message includes first RRC configuration content and a channel configuration parameter.

In one embodiment, when the user equipment establishes a communication connection to the first base station, the first base station may check whether a service volume of the user equipment is greater than a first preset threshold and whether load of the first base station exceeds a second preset threshold; and when detecting that the service volume of the user equipment is greater than the first preset threshold or the load of the first base station exceeds the second preset threshold, the first base station may determine that the user equipment needs to configure a multiple-connection communication mode and that the user equipment needs to establish RRC connections to N base stations, where N is an integer greater than or equal to 2. In this case, the first base station may send the RRC configuration message to the user equipment, where the RRC configuration message includes the first RRC configuration content and the channel configuration parameter. The first RRC configuration content includes a plurality of communications protocol layer configurations between the first base station and the user equipment, such as a PDCP configuration, an RLC configuration, a MAC layer configuration, and a physical layer configuration that are in the LTE system. The channel configuration parameter may include a random access channel parameter, a channel bandwidth parameter, a physical layer feedback channel, a physical layer control channel location, and the like. The user equipment may access a second base station by using the channel configuration parameter. The first base station may be a master base station, and the second base station may be a secondary base station.

S702. The user equipment configures an RRC connection between the user equipment and the first base station in response to the first RRC configuration content, and establishes an RRC connection to a second base station based on the channel configuration parameter.

S703. The second base station sends second RRC configuration content to the user equipment.

In one embodiment, after the user equipment establishes the RRC connection to the second base station, the second base station may directly send the second RRC configuration content to the user equipment. Therefore, it is not required that the second base station should send the second RRC configuration content to the first base station and then the first base station forwards the second RRC configuration content to the user equipment. During such a forwarding process, the second RRC configuration content is resent to the second base station due to offloading, resulting in a transmission delay. According to the method, a transmission delay can be reduced and signaling load of the first base station can be reduced. The second RRC configuration content may include a plurality of communications protocol layer configurations between the second base station and the user equipment, such as a PDCP configuration, an RLC configuration, a MAC layer configuration, and a physical layer configuration.

S704. The user equipment configures the RRC connection between the user equipment and the second base station in response to the second RRC configuration content.

S705. The user equipment sends a signal measurement report.

In one embodiment, the user equipment may send the signal measurement report to the second base station, and then the second base station forwards the signal measurement report to the first base station. Alternatively, the user equipment may directly send the signal measurement report to the first base station.

S706. The first base station determines, based on the signal measurement report, whether the user equipment needs to be handed over between cells, and when determining that the user equipment needs to be handed over between cells, selects the second base station as a master base station to be accessed by the user equipment.

In one embodiment, the signal measurement report includes signal quality corresponding to a plurality of base stations connected to the user equipment. If signal quality corresponding to the first base station is lower than a preset threshold, it may be determined that the user equipment needs to be handed over between cells; signal quality corresponding to other base stations is compared; and a base station with higher signal quality is selected from the other base stations and is used for handover. If the second base station is selected as the master base station to be accessed by the user equipment, the following operation procedure is performed.

S707. The first base station sends a handover request to the second base station.

S708. When the second base station allows the user equipment to access the second base station by using the second base station as the master base station, the second base station sends reconfiguration information to the first base station, where the reconfiguration information includes basic information such as a cell identity, a cell location, and access time that are of a cell corresponding to the second base station.

S709. The first base station sends an update request that includes the reconfiguration information to the user equipment.

S710. The user equipment accesses, according to the update request, the second base station by using the second base station as the master base station.

It should be noted that the first base station determines, based on the signal measurement report, whether the user equipment needs to be handed over between cells, and when determining that the user equipment needs to be handed over between cells, selects the second base station as the master base station to be accessed by the user equipment, or may select another base station as the master base station to be accessed by the user equipment. When the another base station allows the user equipment to access the another base station by using the second base station as the master base station, the first base station sends the update request that includes the reconfiguration information to the user equipment, and the user equipment accesses the another base station according to the update request.

In this embodiment, the user equipment sends the signal measurement report; when determining, based on the signal measurement report, that the user equipment needs to be handed over between cells, the first base station selects the second base station as the master base station to be accessed by the user equipment, and sends the handover request to the second base station; if the second base station allows the user equipment to access the second base station by using the second base station as the master base station, the second base station sends the reconfiguration information to the first base station; and the user equipment receives the update request that includes the reconfiguration information and that is send by the first base station, and accesses, based on the update request, the second base station by using the second base station as the master base station. This resolves a problem that when the user equipment needs to change an accessed master base station, communication cannot be performed in time because the user equipment needs to end an RRC connection between the master base station and the user equipment. Accordingly, the RRC connection between the master base station and the user equipment does not need to be ended, so that a handover delay is reduced.

Figure 8:
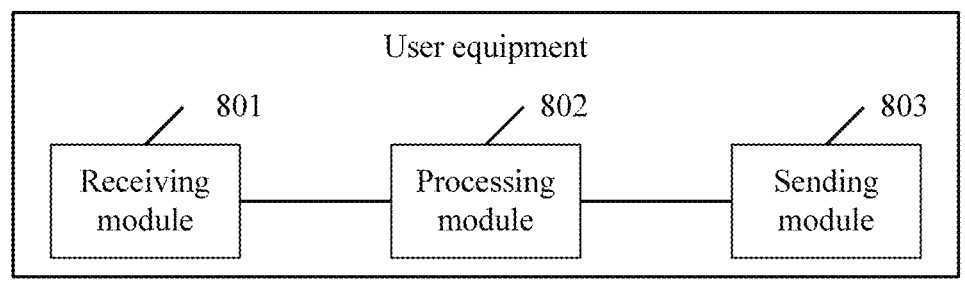
FIG. 8 is a schematic structural diagram of user equipment according to an embodiment.

FIG. 8 is a schematic structural diagram of user equipment according to an embodiment. As shown in the figure, the user equipment in this embodiment includes a receiving module 801, a processing module 802, and a sending module 803.

The receiving module 801 is configured to receive an RRC configuration message sent by a first base station, where the RRC configuration message includes first RRC configuration content and a channel configuration parameter.

In one embodiment, when the user equipment establishes a communication connection to the first base station, the first base station may check whether a service volume of the user equipment is greater than a first preset threshold and whether load of the first base station exceeds a second preset threshold; and when detecting that the service volume of the user equipment is greater than the first preset threshold or the load of the first base station exceeds the second preset threshold, the first base station may determine that the user equipment needs to configure a multiple-connection communication mode and that the user equipment needs to establish RRC connections to N base stations, where N is an integer greater than or equal to 2. In this case, the first base station may send the RRC configuration message to the user equipment, where the RRC configuration message includes the first RRC configuration content and the channel configuration parameter. The first RRC configuration content includes a plurality of communications protocol layer configurations between the first base station and the user equipment, such as a PDCP configuration, an RLC configuration, a MAC configuration, and a physical layer configuration that are in the LTE system. The channel configuration parameter may include a random access channel parameter, a channel bandwidth parameter, a physical layer feedback channel, a physical layer control channel location, and the like. The user equipment may access a second base station by using the channel configuration parameter. The first base station may be a master base station, and the second base station may be a secondary base station.

The processing module 802 is configured to: configure an RRC connection between the user equipment and the first base station in response to the first RRC configuration content, and establish an RRC connection to the second base station based on the channel configuration parameter.

In one embodiment, after the user equipment establishes the RRC connection to the second base station, the second base station may directly send second RRC configuration content to the user equipment. Therefore, it is not required that the second base station should send the second RRC configuration content to the first base station and then the first base station forwards the second RRC configuration content to the user equipment. During such a forwarding process, the second RRC configuration content is resent to the second base station due to offloading, resulting in a transmission delay. Accordingly, a transmission delay can be reduced and signaling load of the first base station can be reduced. The second RRC configuration content may include a plurality of communications protocol layer configurations between the second base station and the user equipment, such as a PDCP configuration, an RLC configuration, a MAC layer configuration, and a physical layer configuration.

The receiving module 801 is further configured to receive the second RRC configuration content sent by the second base station.

In one embodiment, the user equipment may send a signal measurement report to the second base station, and then the second base station forwards the signal measurement report to the first base station. Alternatively, the user equipment may directly send the signal measurement report to the first base station.

The processing module 802 is further configured to configure the RRC connection between the user equipment and the second base station in response to the second RRC configuration content.

In one embodiment, each module in this embodiment may further perform the following operations.

The sending module 803 is configured to send an instruction message to the second base station when a radio link fails in the RRC connection between the user equipment and the first base station, so that the second base station forwards the instruction message to the first base station, where the instruction message is used to instruct the first base station to select a third base station as a target base station to be accessed by the user equipment, and the instruction message is further used to instruct the first base station to send access configuration information to the second base station, so that the second base station forwards the access configuration information to the user equipment, where the instruction message includes RRC signaling, a MAC control element, physical layer indication information, or the like.

It should be noted that the user equipment detects channel quality of a physical layer PDCCH channel according to a preset period, and delivers the channel quality to an RRC layer after smoothing calculation is performed. If average channel quality obtained through calculation is lower than a preset threshold, a radio link fails in an RRC connection between the user equipment and a base station. If a radio link fails in the RRC connection between the first base station (e.g., the master base station) and the user equipment, the user equipment needs to perform an RRC connection reestablishment procedure, and selects a cell with high channel quality for random access. If a radio link fails in the RRC connection between the second base station (e.g., the secondary base station) and the user equipment, the user equipment may send link failure information to the first base station, and then the first base station performs corresponding processing, for example, reselects a base station as a secondary base station corresponding to the user equipment, or instructs the second base station to modify a link configuration. The following provides descriptions by using an example in which a radio link fails in the RRC connection between the user equipment and the first base station.

In one embodiment, when sending the instruction message to the second base station, the user equipment may further send the signal measurement report to the second base station, and the second base station forwards the signal measurement report to the first base station, where the signal measurement report includes signal quality corresponding to base stations connected to the user equipment.

After receiving the instruction message, the first base station may compare, based on the signal measurement report reported by the user equipment, the signal quality corresponding to the base stations connected to the user equipment, select the third base station with higher quality as the target base station to be accessed by the user equipment, and send a reconfiguration request to the third base station. After the third base station receives the reconfiguration request, if the third base station disallows access of the user equipment, the third base station instructs the first base station to select another base station as a target base station to be accessed by the user equipment; if the third base station allows access of the user equipment, the third base station sends third RRC configuration content to the first base station. The first base station may send the access configuration information and the third RRC configuration content to the second base station together, and the second base station forwards the access configuration information and the third RRC configuration content to the user equipment. The access configuration information includes a cell identity, system bandwidth, a broadcast message, a basic random access message, and the like that are corresponding to the third base station. The third RRC configuration content includes a plurality of communications protocol layer configurations between the third base station and the user equipment, such as a PDCP configuration, an RLC configuration, a MAC layer configuration, and a physical layer configuration.

The receiving module 801 is further configured to receive the access configuration information sent by the second base station.

The processing module 802 is further configured to establish an RRC connection to the third base station based on the access configuration information.

In one embodiment, after receiving the access configuration information, the user equipment may stop using the first base station as a main control bearer base station of the user equipment, and delete configuration information of the RRC connection between the first base station and the user equipment; use the third base station as the main control bearer base station of the user equipment; and configure the RRC connection between the user equipment and the third base station in response to the third RRC configuration content.

In one embodiment, as shown in FIG. 8, each module in this embodiment may further perform the following operations.

The sending module 803 is further configured to send the signal measurement report, where the signal measurement report is used by the first base station to select, when determining that the user equipment needs to be handed over between cells, the second base station as a master base station to be accessed by the user equipment, the signal measurement report is further used to instruct the first base station to send a handover request to the second base station, the handover request is used to request the second base station to allow the user equipment to access the second base station by using the second base station as the master base station, and the handover request is further used to instruct the second base station to send reconfiguration information to the first base station.

In one embodiment, the signal measurement report includes signal quality corresponding to a plurality of base stations connected to the user equipment. If signal quality corresponding to the first base station is lower than a preset threshold, it may be determined that the user equipment needs to be handed over between cells; signal quality corresponding to other base stations is compared; and a base station with higher signal quality is selected from the other base stations and is used for handover. If the second base station is selected as the master base station to be accessed by the user equipment, the first base station sends the handover request to the second base station; when the second base station allows the user equipment to access the second base station by using the second base station as the master base station, the second base station sends the reconfiguration information to the first base station; and the first base station sends an update request that includes the reconfiguration information to the user equipment. The reconfiguration information includes basic information such as a cell identity, a cell location, and access time that are of a cell corresponding to the second base station.

The receiving module 801 is further configured to receive the update request that includes the reconfiguration information and that is sent by the first base station.

The processing module 802 is further configured to access, according to the update request, the second base station by using the second base station as the master base station.

In this embodiment, the user equipment receives the RRC configuration message sent by the first base station, where the RRC configuration message includes the first RRC configuration content and the channel configuration parameter; configures the RRC connection between the user equipment and the first base station in response to the first RRC configuration content, and establishes the RRC connection to the second base station based on the channel configuration parameter; receives, based on the RRC connection established to the second base station, the second RRC configuration content sent by the second base station; and configures the RRC connection between the user equipment and the second base station in response to the second RRC configuration content. In this way, the second base station can independently send the RRC configuration content of the second base station to the user equipment without a need to forward the RRC configuration content of the second base station by the first base station to the user equipment, thereby reducing the transmission delay between base stations and reducing the signaling load of the first base station.

Figure 9:
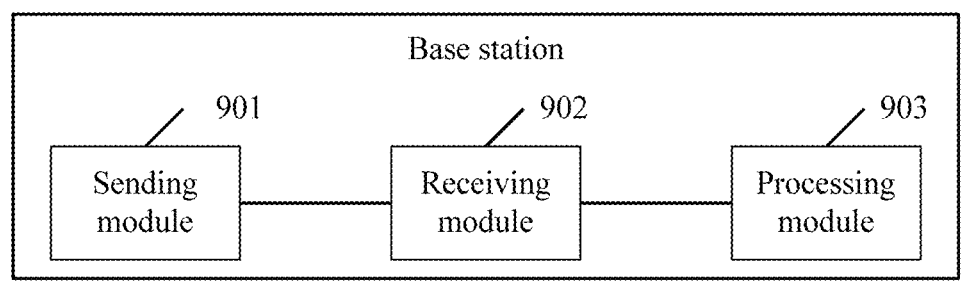
FIG. 9 is a schematic structural diagram of a base station according to an embodiment.

FIG. 9 is a schematic structural diagram of a base station according to an embodiment. As shown in the figure, the base station in this embodiment includes:

a sending module 901 configured to send an RRC configuration message to user equipment, where the RRC configuration message includes first RRC configuration content and a channel configuration parameter, where the first RRC configuration content is used by the user equipment to configure an RRC connection between the user equipment and the first base station, and the channel configuration parameter is used by the user equipment to establish an RRC connection to a second base station, so that the user equipment receives second RRC configuration content sent by the second base station, and configures the RRC connection between the user equipment and the second base station in response to the second RRC configuration content.

In one embodiment, when the user equipment establishes a communication connection to the first base station, the first base station may check whether a service volume of the user equipment is greater than a first preset threshold and whether load of the first base station exceeds a second preset threshold; and when detecting that the service volume of the user equipment is greater than the first preset threshold or the load of the first base station exceeds the second preset threshold, the first base station may determine that the user equipment needs to configure a multiple-connection communication mode and that the user equipment needs to establish RRC connections to N base stations, where N is an integer greater than or equal to 2. In this case, the first base station may send the RRC configuration message to the user equipment, where the RRC configuration message includes the first RRC configuration content and the channel configuration parameter. The first RRC configuration content includes a plurality of communications protocol layer configurations between the first base station and the user equipment, such as a PDCP configuration, an RLC configuration, a MAC layer configuration, and a physical layer configuration that are in the LTE system. The channel configuration parameter may include a random access channel parameter, a channel bandwidth parameter, a physical layer feedback channel, a physical layer control channel location, and the like. The user equipment may access the second base station by using the channel configuration parameter. The first base station may be a master base station, and the second base station may be a secondary base station.

In one embodiment, as shown in FIG. 9, the base station in this embodiment may further include:

a receiving module 902 configured to receive an instruction message sent by the second base station, where the instruction message is sent by the user equipment to the second base station when a radio link fails in the RRC connection between the user equipment and the first base station, and is forwarded by the second base station.

It should be noted that the user equipment detects channel quality of a physical layer PDCCH channel according to a preset period, and delivers the channel quality to an RRC layer after smoothing calculation is performed. If average channel quality obtained through calculation is lower than a preset threshold, a radio link fails in an RRC connection between the user equipment and a base station. If a radio link fails in the RRC connection between the first base station (e.g., the master base station) and the user equipment, the user equipment needs to perform an RRC connection reestablishment procedure, and selects a cell with high channel quality for random access. If a radio link fails in the RRC connection between the second base station (e.g., the secondary base station) and the user equipment, the user equipment may send link failure information to the first base station, and then the first base station performs corresponding processing, for example, reselects a base station as a secondary base station corresponding to the user equipment, or instructs the second base station to modify a link configuration. This embodiment provides descriptions by using an example in which a radio link fails in the RRC connection between the user equipment and the first base station.

In one embodiment, when sending the instruction message to the second base station, the user equipment may further send a signal measurement report to the second base station, and the second base station forwards the signal measurement report to the first base station, where the signal measurement report includes signal quality corresponding to base stations connected to the user equipment.

A processing module 903 is configured to: select, according to the instruction message, a third base station as a target base station to be accessed by the user equipment, and send access configuration information to the second base station, so that the second base station forwards the access configuration information to the user equipment, where the access configuration information is used by the user equipment to establish an RRC connection to the third base station.

In one embodiment, after receiving the instruction message, the first base station may compare, based on the signal measurement report reported by the user equipment, the signal quality corresponding to the base stations connected to the user equipment, select the third base station with higher quality as the target base station to be accessed by the user equipment, and send a reconfiguration request to the third base station. After the third base station receives the reconfiguration request, if the third base station disallows access of the user equipment, the third base station instructs the first base station to select another base station as a target base station to be accessed by the user equipment; if the third base station allows access of the user equipment, the third base station sends third RRC configuration content to the first base station. The first base station may send the access configuration information and the third RRC configuration content to the second base station together, and the second base station forwards the access configuration information and the third RRC configuration content to the user equipment. The access configuration information includes a cell identity, system bandwidth, a broadcast message, a basic random access message, and the like that are corresponding to the third base station. The third RRC configuration content includes a plurality of communications protocol layer configurations between the third base station and the user equipment, such as a PDCP configuration, an RLC configuration, a MAC layer configuration, and a physical layer configuration.

In one embodiment, each module of the base station in this embodiment may further perform the following operations.

The receiving module 902 is further configured to receive the signal measurement report sent by the user equipment.

The processing module 903 is further configured to: select, based on the signal measurement report when determining that the user equipment needs to be handed over between cells, the second base station as a master base station to be accessed by the user equipment, and send a handover request to the second base station, where the handover request is used to request the second base station to allow the user equipment to access the second base station by using the second base station as the master base station, and the handover request is further used to instruct the second base station to send reconfiguration information to the first base station, so that the first base station sends an update request that includes the reconfiguration information to the user equipment, where the update request is used by the user equipment to access the second base station by using the second base station as the master base station.

In one embodiment, the signal measurement report includes signal quality corresponding to a plurality of base stations connected to the user equipment. If signal quality corresponding to the first base station is lower than a preset threshold, it may be determined that the user equipment needs to be handed over between cells; signal quality corresponding to other base stations is compared; and a base station with higher signal quality is selected from the other base stations and is used for handover. If the second base station is selected as the master base station to be accessed by the user equipment, the first base station sends the handover request to the second base station; and when the second base station allows the user equipment to access the second base station by using the second base station as the master base station, the second base station sends the reconfiguration information to the first base station. The reconfiguration information includes basic information such as a cell identity, a cell location, and access time that are of a cell corresponding to the second base station.

The receiving module 902 is further configured to receive the reconfiguration information sent by the second base station.

The processing module 903 is further configured to send the update request that includes the reconfiguration information to the user equipment, where the update request is used by the user equipment to access the second base station by using the second base station as the master base station.

In this embodiment, the first base station sends the RRC configuration message to the user equipment; after receiving the RRC configuration message sent by the first base station, the user equipment configures the RRC connection between the user equipment and the first base station in respond to the first RRC configuration content, and establishes the RRC connection to the second base station based on the channel configuration parameter; the second base station sends the second RRC configuration content to the user equipment; and after receiving the second RRC configuration content sent by the second base station, the user equipment configures the RRC connection between the user equipment and the second base station in respond to the second RRC configuration content. In this way, the second base station can independently send the RRC configuration content of the second base station to the user equipment without a need to forward the RRC configuration content of the second base station by the first base station to the user equipment, thereby reducing a transmission delay between base stations and reducing signaling load of the first base station.

Figure 10:
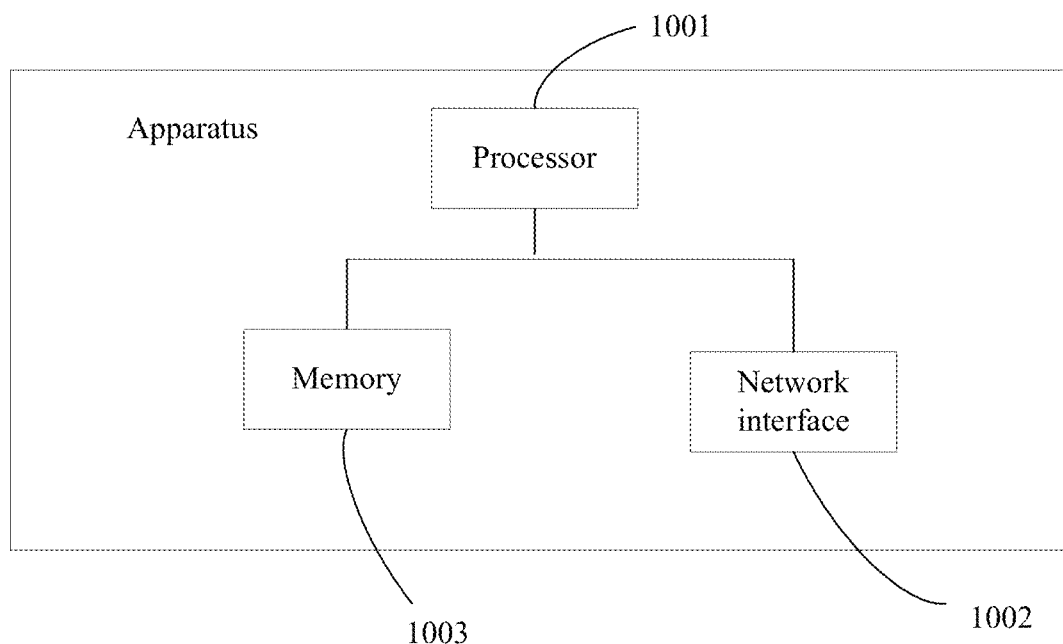
FIG. 10 is a schematic structural diagram of an RRC configuration apparatus according to an embodiment.

FIG. 10 is a schematic structural diagram of an RRC configuration apparatus according to an embodiment. As shown in FIG. 10, the RRC configuration apparatus includes a processor 1001 and a network interface 1002, and a memory 1003 is also shown in the figure. The processor 1001, the network interface 1002, and the memory 1003 are connected and communicate with each other.

The following operations are performed: receiving an RRC configuration message sent by a first base station, where the RRC configuration message includes first RRC configuration content and a channel configuration parameter;

configuring an RRC connection between user equipment and the first base station in response to the first RRC configuration content, and establishing an RRC connection to a second base station based on the channel configuration parameter;

receiving second RRC configuration content sent by the second base station; and configuring the RRC connection between the user equipment and the second base station in response to the second RRC configuration content.

The processor 1001 may be configured to perform the following operation steps:

sending an instruction message to the second base station when a radio link fails in the RRC connection between the user equipment and the first base station, so that the second base station forwards the instruction message to the first base station, where the instruction message is used to instruct the first base station to select a third base station as a target base station to be accessed by the user equipment, and the instruction message is further used to instruct the first base station to send access configuration information to the second base station, so that the second base station forwards the access configuration information to the user equipment;

receiving the access configuration information sent by the second base station; and establishing an RRC connection to the third base station based on the access configuration information.

The processor 1001 may be configured to perform the following operation steps:

sending, by the user equipment, a signal measurement report, where the signal measurement report is used by the first base station to select, when determining that the user equipment needs to be handed over between cells, the second base station as a master base station to be accessed by the user equipment, the signal measurement report is further used to instruct the first base station to send a handover request to the second base station, the handover request is used to request the second base station to allow the user equipment to access the second base station by using the second base station as the master base station, and the handover request is further used to instruct the second base station to send reconfiguration information to the first base station;

receiving an update request that includes the reconfiguration information and that is sent by the first base station; and accessing, according to the update request, the second base station by using the second base station as the master base station.

The processor 1001 may be configured to perform the following operation steps:

receiving third RRC configuration content sent by the second base station, where the third RRC configuration content is sent by the third base station to the first base station when the third base station allows access of the user equipment after receiving a reconfiguration request sent by the first base station, and is forwarded by the first base station to the second base station; and configuring the RRC connection between the user equipment and the third base station in response to the third RRC configuration content.

It should be noted that the processor 1001 herein may be a processing component or may be a joint name of a plurality of processing components. For example, the processing component may be a central processing unit (CPU), or an application-specific integrated circuit (ASIC), or may be configured as one or more integrated circuits implementing this embodiment, for example, one or more microprocessors, digital signal processor (DSP) or one or more field programmable gate arrays (FPGA).

The memory 1003 may be a storage apparatus or may be a joint name of a plurality of storage components, and is configured to store executable program code, or a parameter, data, and the like that are required for running of an application program running apparatus. The memory 1003 may include a random access memory (RAM) or may include a non-volatile memory, such as a magnetic disk memory or a flash memory.

The apparatus may further include an input/output apparatus. The input/output apparatus may provide an input user interface for an operator, so that the operator selects a control option by using the input user interface; or provide another interface through which the apparatus can be externally connected to another device. The network interface 1002 includes a component that is not in a wired connection form such as an antenna, a related device, and an air interface. The network interface also includes a component that is in a wired connection form such as a cable and a related device.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in this specification are examples, and the related actions and modules are not necessarily mandatory to the present disclosure.

In the foregoing embodiments, the descriptions of the embodiments have respective focuses. For a part that is not described in detail in an embodiment, reference may be made to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disc, or the like.

The foregoing describes RRC configuration method and the related device that are provided in the embodiments of the present disclosure. This specification describes the principle and implementations of the present disclosure by using specific examples. The descriptions about the foregoing embodiments are merely provided to help understand the method and core ideas of the present disclosure. In addition, a person of ordinary skill in the art can make modifications to the specific implementations and application scopes according to the ideas of the present disclosure. Therefore, the content of this specification shall not be construed as a limitation to the present disclosure.

What is claimed is:

1. A method for configuring radio resource control (RRC), the method comprising:
   receiving, by user equipment, an RRC configuration message sent by a first base station, wherein the RRC configuration message comprises first RRC configuration content and a channel configuration parameter;
   configuring, by the user equipment, a first RRC connection between the user equipment and the first base station in response to the first RRC configuration content, and establishing a second RRC connection between the user equipment and a second base station based on the channel configuration parameter;
   receiving, by the user equipment, second RRC configuration content sent by the second base station;
   configuring, by the user equipment, the second RRC connection between the user equipment and the second base station in response to the second RRC configuration content; and
   sending, by the user equipment, an instruction message to the second base station when a radio link fails in the first RRC connection between the user equipment and the first base station, so that the second base station forwards the instruction message to the first base station, wherein the instruction message is used to instruct the first base station to select a third base station as a target base station to be accessed by the user equipment.

2. The method according to claim 1, further comprising:
   receiving, by the user equipment, the access configuration information sent by the second base station; and
   establishing, by the user equipment, a third RRC connection between the user equipment and the third base station based on the access configuration information;
   wherein the instruction message is further used to instruct the first base station to send access configuration information to the second base station, so that the second base station forwards the access configuration information to the user equipment.

3. The method according to claim 2, further comprising:
receiving, by the user equipment, third RRC configuration content sent by the third base station, wherein the third RRC configuration content is sent by the third base station to the first base station when the third base station allows access of the user equipment after receiving a reconfiguration request sent by the first base station, and is forwarded by the first base station to the second base station; and
configuring, by the user equipment, the RRC connection between the user equipment and the third base station in response to the third RRC configuration content.

4. The method according to claim 1, further comprising:
sending, by the user equipment, a signal measurement report, wherein the signal measurement report is used by the first base station to select, when determining that the user equipment needs to be handed over between cells, the second base station as a master base station to be accessed by the user equipment, the signal measurement report is further used to instruct the first base station to send a handover request to the second base station, the handover request is used to request the second base station to allow the user equipment to access the second base station by using the second base station as the master base station, and the handover request is further used to instruct the second base station to send reconfiguration information to the first base station;
receiving, by the user equipment, an update request that comprises the reconfiguration information and that is sent by the first base station; and
accessing, by the user equipment according to the update request, the second base station by using the second base station as the master base station.

5. A method for configuring radio resource control (RRC), the method comprising:
sending, by a first base station, an RRC configuration message to user equipment, wherein the RRC configuration message comprises first RRC configuration content and a channel configuration parameter, wherein the first RRC configuration content is used by the user equipment to configure a first RRC connection between the user equipment and the first base station, and the channel configuration parameter is used by the user equipment to establish a second RRC connection between the user equipment and a second base station, so that the user equipment receives second RRC configuration content sent by the second base station, and configures the second RRC connection between the user equipment and the second base station in response to the second RRC configuration content;
receiving, by the first base station, an instruction message sent by the second base station, wherein the instruction message is sent by the user equipment to the second base station when a radio link fails in the first RRC connection between the user equipment and the first base station, and is forwarded by the second base station; and
selecting, by the first base station according to the instruction message, a third base station as a target base station to be accessed by the user equipment.

6. The method according to claim 5, further comprising:
sending access configuration information to the second base station, so that the second base station forwards the access configuration information to the user equipment, wherein the access configuration information is used by the user equipment to establish a third RRC connection between the user equipment and the third base station.

7. The method according to claim 6, further comprising:
sending, by the first base station, a reconfiguration request to the third base station, wherein the reconfiguration request is used to request the third base station to allow access of the user equipment, and the reconfiguration request is further used to instruct the third base station to send third RRC configuration content to the first base station;
receiving, by the first base station, the third RRC configuration content sent by the third base station; and
forwarding, by the first base station, the third RRC configuration content to the second base station, so that the second base station forwards the third RRC configuration content to the user equipment, wherein the third RRC configuration content is used by the user equipment to configure the third RRC connection between the user equipment and the third base station.

8. The method according to claim 5, further comprising:
receiving, by the first base station, a signal measurement report sent by the user equipment;
selecting, by the first base station based on the signal measurement report when determining that the user equipment needs to be handed over between cells, the second base station as a master base station to be accessed by the user equipment, and sending a handover request to the second base station, wherein the handover request is used to request the second base station to allow the user equipment to access the second base station by using the second base station as the master base station, and the handover request is further used to instruct the second base station to send reconfiguration information to the first base station;
receiving, by the first base station, the reconfiguration information sent by the second base station; and
sending, by the first base station, an update request that comprises the reconfiguration information to the user equipment, wherein the update request is used by the user equipment to access the second base station by using the second base station as the master base station.

9. An apparatus comprising a network interface, a memory, and a processor, the memory stores a set of program code, and the processor is configured to invoke the program code stored in the memory to perform operations, the operations comprising:
receiving an RRC configuration message sent by a first base station, wherein the RRC configuration message comprises first RRC configuration content and a channel configuration parameter;
configuring a first RRC connection between user equipment and the first base station in response to the first RRC configuration content, and establishing a second RRC connection between the user equipment and a second base station based on the channel configuration parameter;
receiving second RRC configuration content sent by the second base station;
configuring the second RRC connection between the user equipment and the second base station in response to the second RRC configuration content; and
sending an instruction message to the second base station when a radio link fails in the first RRC connection between the user equipment and the first base station, so that the second base station forwards the instruction message to the first base station, wherein the instruction message is used to instruct the first base station to select a third base station as a target base station to be accessed by the user equipment.

10. The apparatus according to claim 9, wherein the operations further comprise:
  receiving the access configuration information sent by the second base station; and
  establishing a third RRC connection between the user equipment and the third base station based on the access configuration information;
  wherein the instruction message is further used to instruct the first base station to send access configuration information to the second base station, so that the second base station forwards the access configuration information to the user equipment.

11. The apparatus according to claim 10, wherein the operations further comprise:
  receiving third RRC configuration content sent by the second base station, wherein the third RRC configuration content is sent by the third base station to the first base station when the third base station allows access of the user equipment after receiving a reconfiguration request sent by the first base station, and is forwarded by the first base station to the second base station; and
  configuring the third RRC connection between the user equipment and the third base station in response to the third RRC configuration content.

12. The apparatus according to claim 9, wherein the operations further comprise:
  sending a signal measurement report, wherein the signal measurement report is used by the first base station to select, when determining that the user equipment needs to be handed over between cells, the second base station as a master base station to be accessed by the user equipment, the signal measurement report is further used to instruct the first base station to send a handover request to the second base station, the handover request is used to request the second base station to allow the user equipment to access the second base station by using the second base station as the master base station, and the handover request is further used to instruct the second base station to send reconfiguration information to the first base station;
  receiving an update request that comprises the reconfiguration information and that is sent by the first base station; and
  accessing according to the update request, the second base station by using the second base station as the master base station.

\* \* \* \* \*